G. R. DELAMATER.
MINERAL WASHING APPARATUS.
APPLICATION FILED MAY 21, 1919.

1,352,727.

Patented Sept. 14, 1920.
3 SHEETS—SHEET 1.

Inventor:
George R. Delamater,
By Chas. N. Butler
Attorney.

G. R. DELAMATER.
MINERAL WASHING APPARATUS.
APPLICATION FILED MAY 21, 1919.

1,352,727.

Patented Sept. 14, 1920.
3 SHEETS—SHEET 3.

Inventor:
George R. Delamater,
By Chas. N. Butler
Attorney.

UNITED STATES PATENT OFFICE.

GEORGE R. DELAMATER, OF STEELTON, PENNSYLVANIA.

MINERAL-WASHING APPARATUS.

1,352,727.

Specification of Letters Patent.   Patented Sept. 14, 1920.

Application filed May 21, 1919. Serial No. 298,740.

*To all whom it may concern:*

Be it known that I, GEORGE R. DELAMATER, a citizen of the United States, residing at Steelton, in the county of Dauphin and State of Pennsylvania, have invented certain Improvements in Mineral-Washing Apparatus, of which the following is a specification.

My invention is designed primarily to provide improved means for washing coal but it will be understood that it is adapted for washing minerals generally, where the substances to be separated have different specific gravities.

The improvements are characterized by the combination, in a simple, compact, convenient, economical and efficient construction, of improved means for automatically separating, discharging, collecting and removing the refuse notwithstanding variations in its amount, and automatically discharging separately the washed coal, with low water consumption, without clogging, with low operating cost, without skilled operators, with ability to handle materials of widely varying compositions, and with the delivery of clean products.

The characteristic features of the invention are more fully set forth in the following description and the accompanying drawings in illustration thereof.

Figure 1:
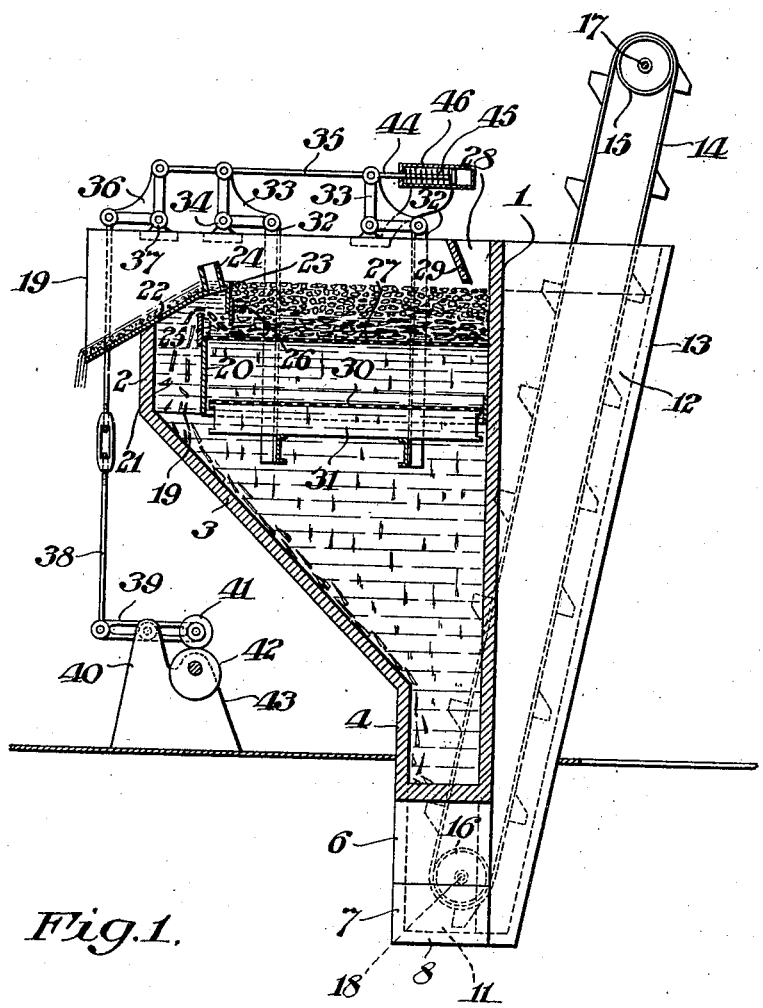
Figure 2:
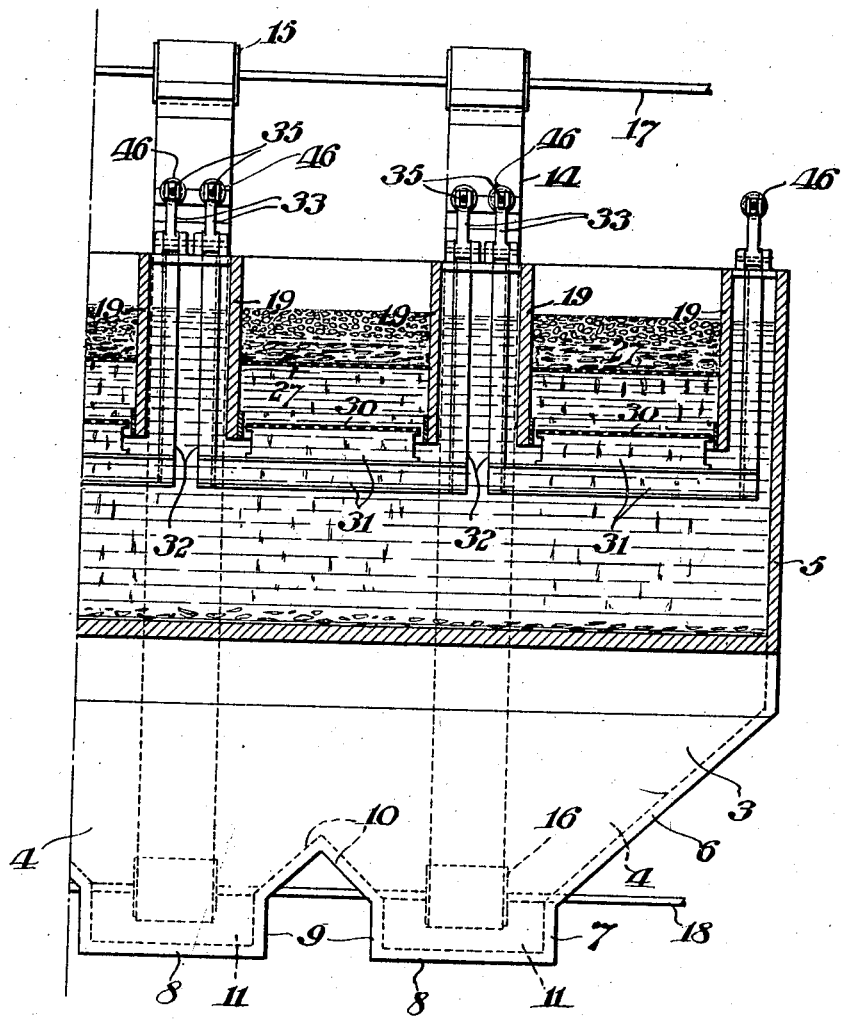
Figure 3:
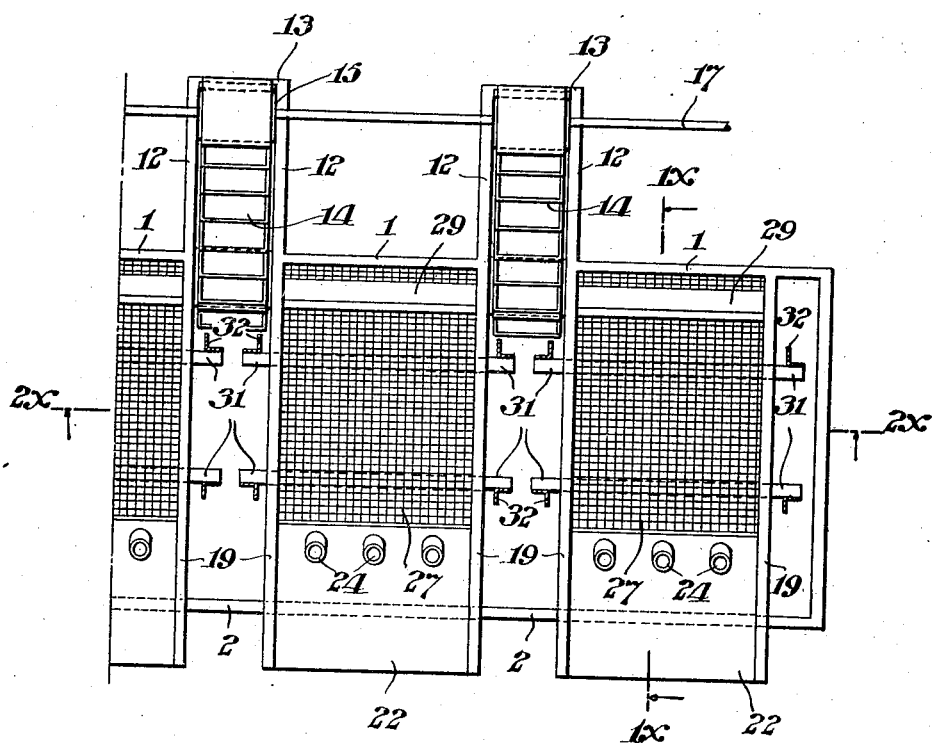

In the drawings, Figure 1 is a part sectional elevation of apparatus embodying my improvements, taken on the line $1^x$—$1^x$ of Fig. 3; Fig. 2 is a part sectional elevation of the same taken on the line $2^x$—$2^x$ of Fig. 3, and Fig. 3 is a broken plan view thereof.

The apparatus is provided with a body comprising the side sections 1, the opposite side sections 2, the inclined sections 3 extending downwardly from the sections 2 toward the sections 1, the side sections 4 extending downwardly from the sections 3, the end sections 5, the inclined end sections 6 extending inwardly from the sections 5, the end sections 7 extending downwardly from the sections 6, the bottom sections 8, the arch walls 9, and the oppositely inclined arch sections 10, the body having thereby formed in the bottom thereof the pockets 11 for collecting refuse falling directly and carried thereto by the inclined sections. The body comprises the further sections 12 extending outwardly from adjacent ends of sections 1 and the section 13 connecting the sections 12 to provide a housing communicating with the interior of the body and the pockets 11 therein.

Bucket conveyers or elevators 14 are carried by the wheels or drums 15 and 16 on the respective journaled shafts 17 and 18 and travel in the housings, the conveyers being adapted for picking up refuse collecting in the pockets 11 and delivering it over the top of the housings.

The body is provided with the vertical partitions or walls 19, in the planes of the walls 12 excepting the end partitions, and the verticle partitions or walls 20 extending between corresponding partitions 19, so as to form, by combination with the wall 2, the passages or spaces 21 above the inclined wall 3.

Overflow boards or chutes 22 extend between partitions 19 outwardly and downwardly across the top of the walls 20 and 2, these boards having the boards 23 depending from their inner ends and the upwardly extending tubes or tubular guards 24 disposed between the parts 20 and 23. The parts 20 and 23 carry the respective vertically adjustable gates 25 and 26, on opposite sides of the openings through the chutes 22.

Horizontal screens 27 extend between the wall 1 and the tops of the respective walls 20, and between adjacent walls 19, below the chutes 28 formed by the boards 29 extending between walls 19 and inclined downwardly toward the walls 1 above the rear of the screens.

Screens 30 of substantially the same area as the screens 27, intersect the spaces between the same walls below such screens 27 respectively. The screens 30 are fixed to and supported by frames 31 which are suspended by hangers 32, these screens and frames providing perforated plungers having approximately the area of the respective superposed screens 27. The plungers are reciprocated by gravity and the crank levers 33, which are fulcrumed on the bearings 34, pivotally connected to the respective hangers 32 and pivotally connected to the respective connecting links 35, the latter being operated to rock the levers by crank levers 36 fulcrumed on the bearings 37 and pivotally connected to the links. The levers 36 are rocked by adjustable rods 38 pivotally connected therewith and with levers 39 which are fulcrumed on bearings 40, the levers 39 being rocked by the engagement of rollers 41 thereon with rotary cams 42 journaled on the bearings 43 To permit the use of lighter plungers and facilitate their downward movement, a rod 44 is connected to each link 35 and to a coiled spring 45 having a bearing in the fixed cylinder 46, the cam 42 acting through the intermediate mechanism to compress the spring in elevating the plunger and the stored energy of the spring acting to shift such mechanism in the reverse direction when permitted by the further revolution of the cam.

In operation, the raw coal to be washed is fed to the body, filled with water, through the chutes 28 which extend over the full widths of the rear ends of the respective screens. Initially, the gates 25 (extending the full width of the respective screens) are up and the gates 26 (extending the full width of the respective screens) are down substantially in contact with the screens. The plungers 30–31, now operating, cause the water to rise and fall regularly, say 125 times per minute, and the resulting pulsations of the water cause the heavier matter as rock, slate and pyrites to work to the bottom of the mass on the screens, with the coal above. When the beds of refuse thus formed attain a depth approximately half the distance from the screens to the tops of the overflow boards, the gates 26 are raised till the distance from their bottoms to the screens is equal to about 2½ times the diameter of the largest piece of material being treated or jigged. The refuse bed now spreads along the screens under the gates and fills the spaces between the gates, due to the fact that the openings through the tubes 24 above the screens permit the water to pulsate between the gates. The gates 25 being adjusted so that their tops are above the bottoms of the gates 26 and according to the character of the material being jigged, the refuse under and on opposite sides of the gates 26 assumes concave forms and provides seals or dams which prevent the passage of coal under these gates since the greater gravity of the refuse prevents the coal from working through it. As the entire body of the apparatus or jig is full of water to the top of the overflow boards and there is no flow of water under the gates 26 or over the gates 25 or otherwise, there is no current or suction tending to draw coal through the refuse bed. If only clean coal be now fed to the bed so that no additional refuse accumulates, no refuse will feed off over the gates 25 and the coal will feed off over the overflow boards or chutes 22. But the further refuse contained in the materials fed to the jig will, by increasing the depth of the refuse bed behind the gates 26, create an unbalanced condition with relation to the lesser depth of refuse between the gates 25 and 26 which, with the water pulsating through the materials on the screens on both sides of the gates 26, will cause the refuse between the gates 25 and 26 to work over the gates 25 and the refuse behind the gates 26 to work thereunder, to replace the depletion. As the refuse is discharged over the gates 25 it falls or settles in the water through the passage 21 upon the inclined sections or chutes 3 which deliver to the pockets 11, whence the elevators convey it away as fast as it accumulates. Any fine refuse which works through the stationary screens 27 and the movable screens 30 falls or settles upon the moving body of coarse refuse sliding down chute 3 and is delivered with the coarse refuse to the pockets, whence it is removed by the elevators.

This removal of the refuse, both coarse and fine, by elevators which are adapted to be operated without interference with the desired pulsations of the water (so essential to continuous operation) or the usual opening of gates for the removal of refuse with resulting discharge of water and interference with the operations, is of great importance in the economical and efficient washing of coal. It has been found in former operations, where intermittent heavy flushing and a continuous limited flow of water have been employed with various devices, the fine refuse will not be satisfactorily removed but will build up with gradual impairment of the operations and finally fill the body of the jig, so that the operation must be stopped periodically (say every ten hours) and the apparatus cleaned out.

In the present apparatus, no water flows away excepting with the washed coal discharged over the overflow boards and there is no waste or disturbance of the desired pulsatory actions by currents. The fine refuse passing through the screens falls upon, is carried by and is removed with the coarser material collecting in the pockets.

As the width of the bed upon the screen, the width of the coal working over the chute, and the width of the gates for passing the refuse from the screen are substantially the same, the entire bed moves forward with each pulsation, with avoidance of packing and irregular action which result when these conditions are substantially varied, and with the advantage of more efficient separation regardless of the variation that may obtain in the character and relative quantities of the coal and refuse.

As the guarded openings provided in the chute permit free pulsation of water through the entire bed on the screen while preventing the escape of water, the entire bed of the material is kept loose and the washed coal is protected from contamination by sulfur in the water as would result if unguarded openings were employed.

The use of the screen plunger having substantially the area of the screen above it, provides for the desired uniform agitation while permitting the passage of fine material, with avoidance of the objectionable features of valved plungers which prevent the passage and permit an accumulation of fine material and are liable to get out of order.

The means provided for chuting the heavier refuse, that works over the screen, under the fine material that falls through the screen and plunger, prevents the packing and building up of fine refuse that otherwise takes place.

The suspension of the plunger from operating means whose rocking parts are out of contact with the water, refuse and coal, reduces the necessary lubrication and wear, while the ready adjustability and accessibility of the mechanism for operating the plunger facilitates the regulation of the character of the pulsation, the lubrication and repairs.

This apparatus has been found, in extended actual service, to take care automatically of variations in refuse in a given run of coal and to separate 92% of the coal as compared with a former separation of 73% of the coal with the best available apparatus.

Having described my invention, I claim:—

1. In apparatus of the class described, the combination with a body adapted for holding water, said body provided with separating means comprising a wall forming spaces within said body in communication above and below said wall, a screen extending across a space aforesaid, a gate for controlling the movement of materials over said screen to said wall, and a plunger having a perforated member extending across said space below said screen whereby water in said body is pulsated to effect the movement of substances on said screen beneath said gate and over said wall, said body being adapted for bringing together under said plunger substances passing over said wall and substances passing through said screen and plunger.

2. In apparatus of the class described, the combination with a body adapted for holding a liquid, said body provided with separating means comprising a wall forming spaces therein, a screen extending across a space aforesaid, a chute above said wall for discharging substances on said screen, a gate above said screen, means containing an aperture through said chute between said wall and gate for facilitating the pulsation of water therebetween, said means adapted for preventing the escape of water, a plunger having a perforated member extending across the space aforesaid beneath said screen, and means whereby said plunger is reciprocated to effect the pulsation of liquid in said body.

3. In apparatus of the class described, the combination of a body adapted for holding a liquid, said body provided with communicating spaces and means for bringing together substances falling in said spaces through said liquid, a screen extending across a space aforesaid, a regulating gate beneath which substances are movable over said screen to said wall, a plunger having a perforated member extending across said space beneath said screen, means whereby said plunger is reciprocated to effect the pulsation of said liquid and the movement of unbalanced substances across said screen beneath said gate and over said wall, and means for elevating and removing from said body substances passing over said wall and through said screen and plunger.

4. In apparatus of the class described, the combination with a body adapted for holding a liquid, said body having a bottom pocket and an inclined member adapted to chute substances falling thereon into said pocket, an elevator for removing substances from said pocket, a wall forming communicating spaces in said body, a screen extending across one of said spaces, a chute for washed material extending across the top of said wall, a gate depending from said chute for regulating the movement of substances across said screen and over said wall, a plunger having a perforated member extending across said space beneath said screen, and means whereby said plunger is reciprocated.

5. In apparatus of the class described, the combination with a body adapted for holding a liquid, of a wall comprising an adjustable top gate forming communicating spaces within said body, a screen extending across a space aforesaid below the top of said gate, a chute for washed substances extending downwardly from a line above said screen across said gate, a gate depending from said chute above said screen, said chute provided with guarded passages between said gates to facilitate pulsation without the substantial loss of liquid therebetween, a plunger having a perforated member extending across said space beneath said screen, and means whereby said plunger is reciprocated.

6. In apparatus of the class described, the combination with a body adapted to hold a liquid, of a screen in said body, a plunger comprising a perforated member in said body beneath said screen, hangers whereby said plunger is suspended, levers whereby said hangers are supported, means comprising a rotary cam and an adjustable connecting rod, whereby said levers are rocked to elevate said plunger and a spring acting to depress said plunger.

7. In apparatus of the class described, the combination with a body having a bottom pocket, means comprising an inclined section for collecting substances in said pocket and a housing communicating with said pocket, of a bucket conveyer traveling in said housing for elevating and discharging substances collected in said pocket, and means comprising a stationary screen having a perforated plunger beneath it for separating mixed solid substances and delivering substances so separated over said screen and through said screen and plunger to said inclined section and thence to said pocket.

8. In apparatus of the class described, the combination with a body adapted for holding water, said body having means comprising a wall provided with a gate forming communicating spaces therein, a screen extending across a space aforesaid to said gate, at the forward end thereof, a chute for delivering materials to the rear end of said screen, a chute above said gate for delivering separated material from said screen, a gate depending from said chute second named for controlling material moving over said screen to said gate first named and forming a depression therein between said gates, said chute second named having guarded apertures between said gates, and means comprising a perforated plunger beneath said screen for pulsating water in said body.

9. In apparatus of the class described, the combination with a body having an inclined section, separating means in said body for providing communicating spaces above said section, said section adapted for receiving and chuting materials falling through said spaces, a screen in a space aforesaid, and means comprising a perforated plunger beneath said screen for agitating liquid in said body and working materials on said screen over said separating means, said screen adapted to deliver material passed therethrough upon material passed over said separating means and upon said inclined section.

10. In apparatus of the class described, the combination with a body having an inclined section, separating means in said body for providing communicating spaces above said section, a screen extending across a space aforesaid, and means comprising a gate above said screen and a perforated plunger extending across said space beneath said screen for agitating liquid in said body and delivering refuse material from said screen to said section.

11. In apparatus of the class described, the combination with a body having compartments with top and bottom communications, of a screen extending across a compartment, an over-flow device extending across said compartment above said screen and a plunger extending across said compartment beneath said screen, said plunger having free openings over substantially its entire area.

12. In apparatus of the class described, the combination with a body having a compartment, of a partition dividing said compartment into spaces communicating above and below it, a screen in one of said spaces extending substantially the width of said compartment, a chute having its top of substantially the width of said compartment and disposed above said screen, an adjustable gate extending downward from the top of said chute and having substantially the width of said compartment, an adjustable gate extending upwardly from said partition and having substantially the width of said compartment, and a perforated plunger beneath said screen having substantially the area thereof and the width of said compartment.

13. In apparatus of the class described, the combination of a body having a compartment, a screen in said compartment, a perforated plunger having passages in said compartment beneath said screen, and a chute having guarded openings over said screen.

14. In apparatus of the class described, the combination of a body having a compartment, a screen in said compartment, a perforated plunger in said compartment beneath said screen, hangers for suspending said plunger, similarly disposed crank levers above said screen for suspending said hangers and means for rocking said levers, said means last named comprising a crank lever oppositely disposed to and connected with the crank levers aforesaid, a rod connected with said crank lever, a lever connected with said rod to operate it and a cam for operating said lever last named.

In testimony whereof I have hereunto set my name this 26th day of April, 1919.

G. R. DELAMATER